Figure 1:
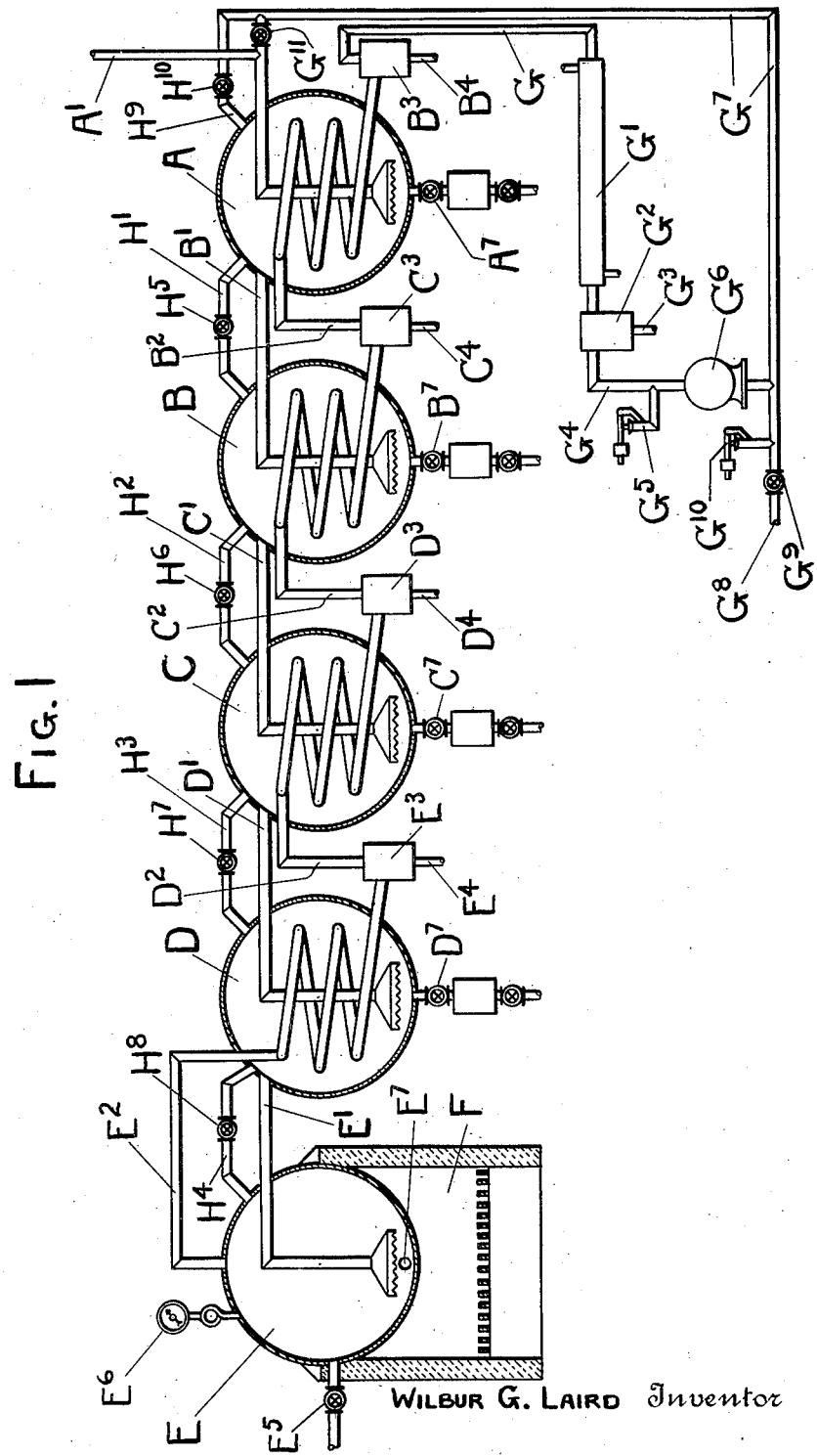

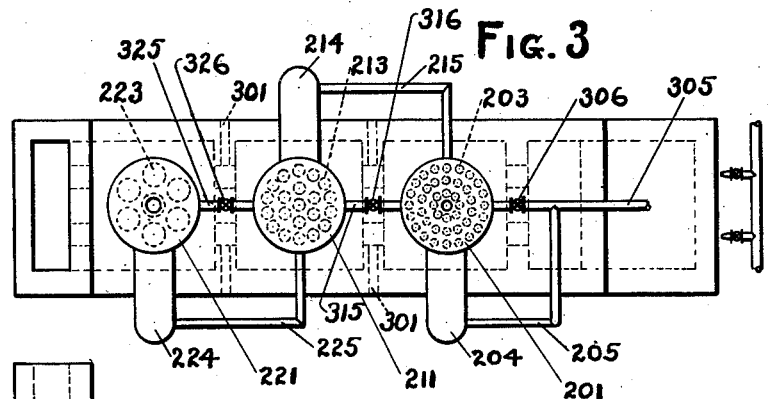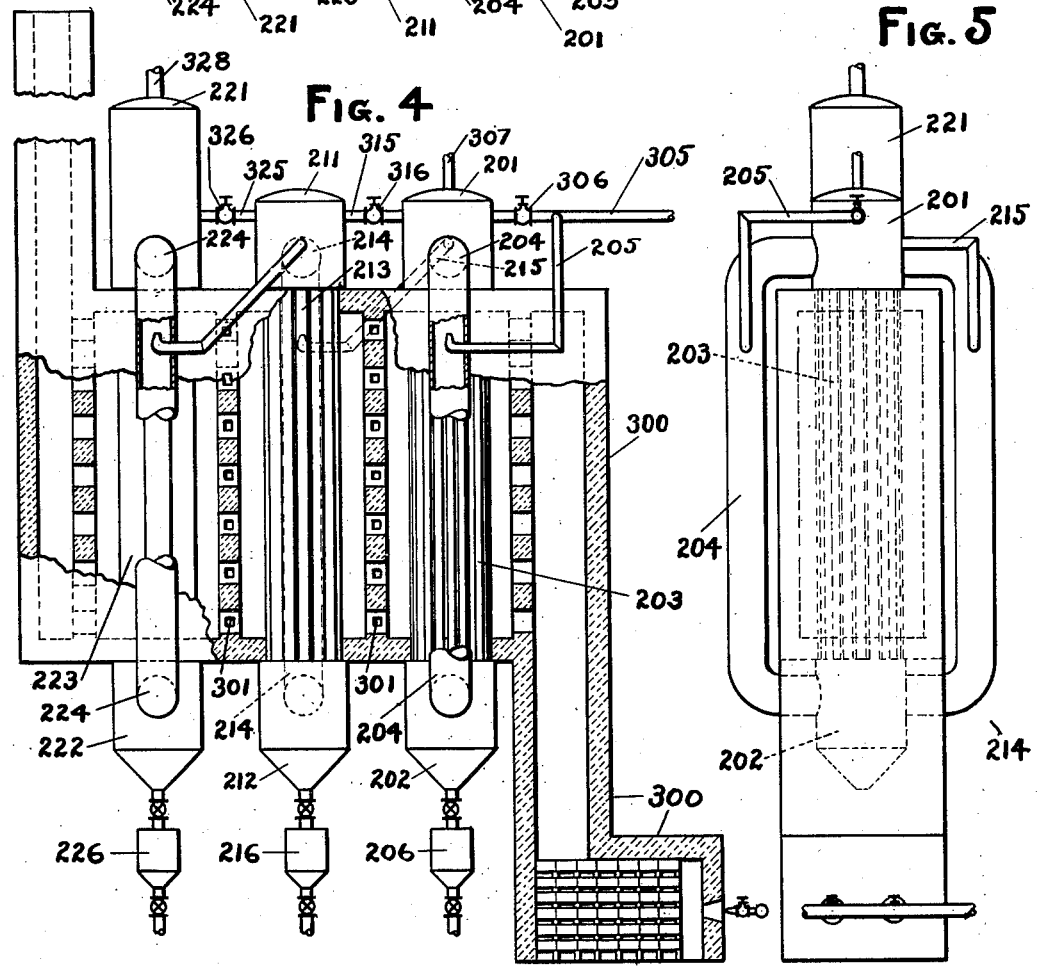

Jan. 19, 1932.　　　　W. G. LAIRD　　　　1,842,179
PROCESS AND APPARATUS FOR THE TREATMENT OF SUBSTANCES WITH HEAT
Filed Jan. 3, 1920　　　4 Sheets-Sheet 4

WILBUR G. LAIRD　Inventor

By his Attorneys

Prindle, Wright and Small.

Patented Jan. 19, 1932

1,842,179

UNITED STATES PATENT OFFICE

WILBUR G. LAIRD, OF NEW YORK, N. Y., ASSIGNOR, BY MESNE ASSIGNMENTS, TO HEAT TREATING COMPANY, OF NEW YORK, N. Y., A CORPORATION OF DELAWARE

PROCESS AND APPARATUS FOR THE TREATMENT OF SUBSTANCES WITH HEAT

Application filed January 3, 1920. Serial No. 349,262.

My invention relates to a process and apparatus for the treatment of substances with heat and has for its object to produce desired products of better quality in greater quantity and at lower cost than heretofore has been possible. The invention is applicable, generally speaking, to all degrees of heat and to all degrees of pressure or lack of pressure to which the substances to be treated can be subjected.

The invention will be illustrated by pointing out the manner in which one embodiment thereof may be applied to the treatment of hydrocarbons,—both for the distillation of hydrocarbons at a temperature less than is necessary for "cracking" or changing the molecular formation of hydrocarbons, and for "cracking" or changing the molecular formation of hydrocarbons at a temperature exceeding that necessary for distillation and usually obtained by heat and pressure.

The use of this illustrative embodiment is not intended to limit the invention to said embodiment as the invention is applicable to many other uses among which may be mentioned the dehydration of substances, such, for example, as emulsified oils. If the emulsion is one of oil and water, one of the constituents (which will depend upon the nature of the oil) may be removed as a gas or vapor and the other removed in any desired manner in liquid form, or they may be separated wholly or in part in liquid form.

The invention results in a larger and better yield and more uniform "cuts" of the desired products with minimum loss of heat. This is obtained, as stated broadly, by a progressive saturation of a circulating medium (either introduced or formed during the process) with the desired products. The circulating medium is saturated progressively, as it passes through progressively heated chambers containing the substance under treatment, with increased quantities of desired products and enters each successive chamber lacking the products which it receives therein thus creating a condition which it is believed facilitates the formation of the desired products in each said successive chamber. In this connection, it is possible that a circulating medium containing undesirable gaseous products may aid in preventing the formation of similar products during the process and in the case of very light gases a polymerization or a combining may take place which will increase the desirable yield by combining with undesirable products to form desirable products. Loss of heat preferably is minimized by utilizing the heat usually wasted in condensation to heat at least in part the substance to be treated which in turn acts to cool at least in part the products obtained by the heat treatment.

Figure 2:
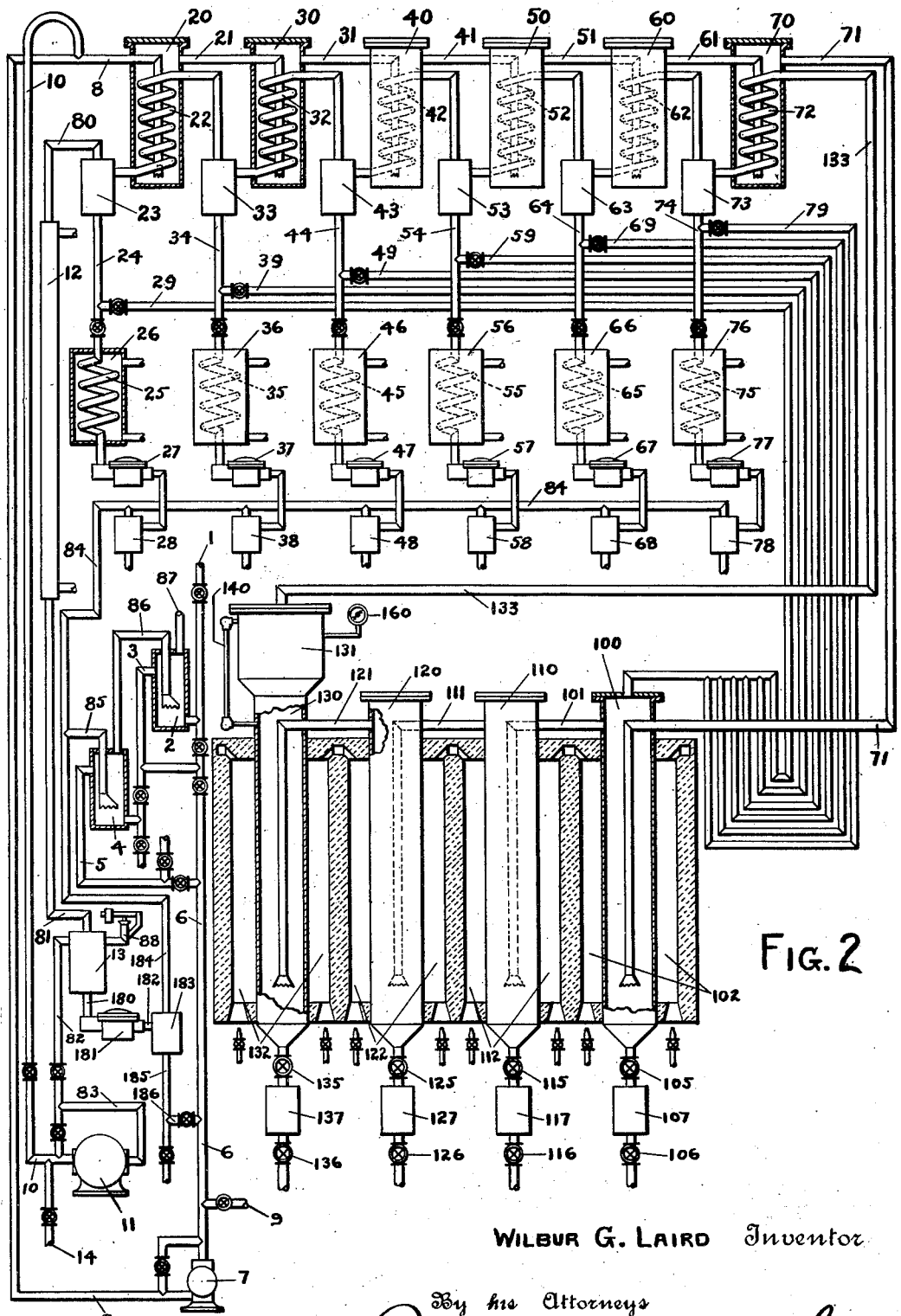
Figure 6:
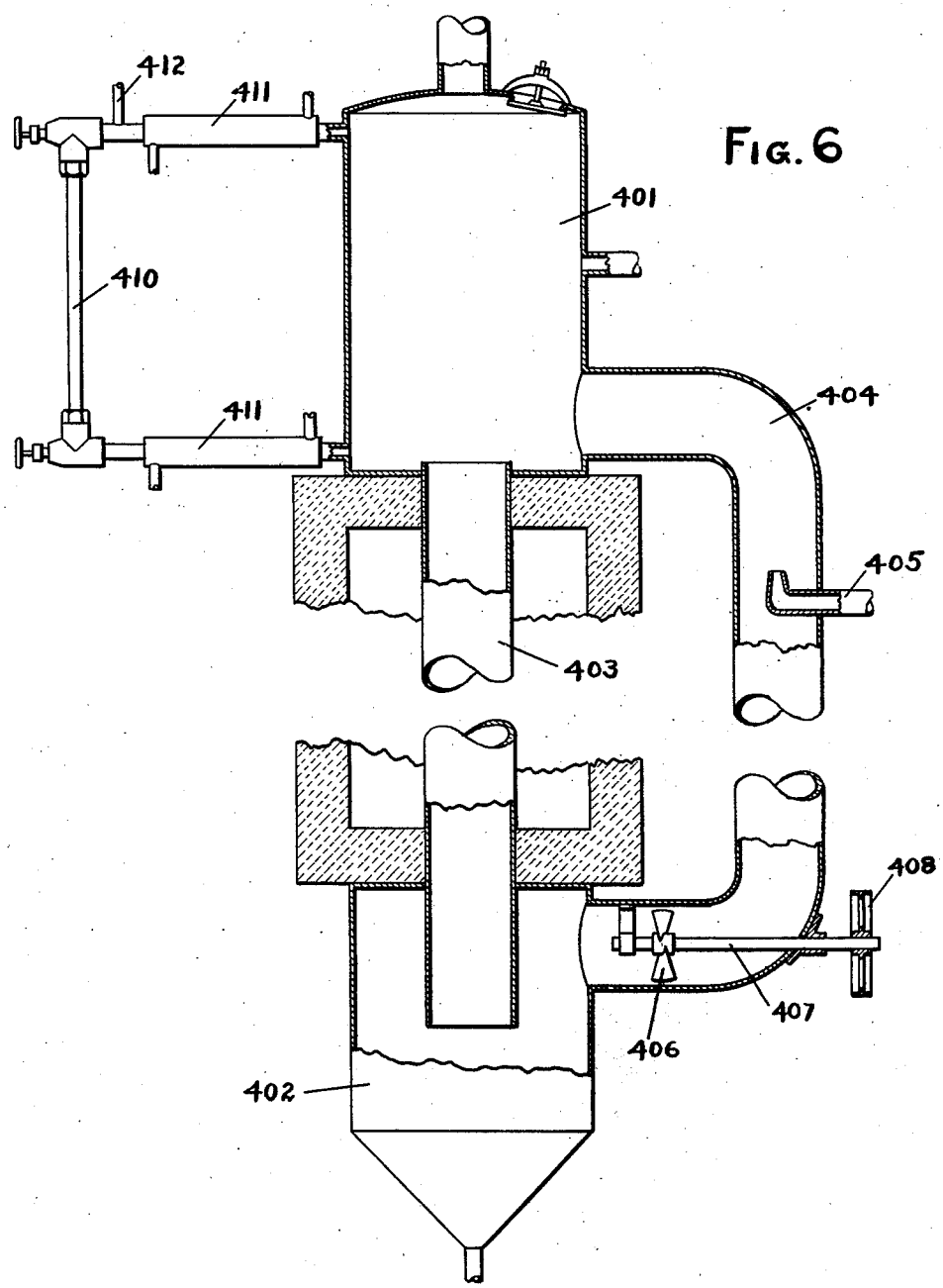

Other and further objects of the invention will be apparent from the following illustration of certain embodiments thereof and from the accompanying drawings, in which Figure 1 is a diagrammatic illustration of one embodiment of the invention;

Figure 2 a diagrammatic illustration of one embodiment of the invention arranged more particularly for cracking or for changing the molecular formation of the substance treated;

Figure 3 a plan of an embodiment of an illustrative series of heating chambers;

Figure 4 a side elevation partly in section of the embodiment of Figure 3;

Figure 5 an end elevation of the embodiment of Figure 3 looking from the right; and Figure 6 an enlarged detailed illustration of a heating chamber.

Similar reference characters refer to similar parts throughout the drawings.

Referring to the embodiment of Figure 1 of the drawings, a series of chambers A, B, C, D, and E in any desired number and without particular limitation as to form is illustrated, the last of which is shown as heated by a furnace F. Although heat may be applied to the other chambers, it preferably should not exceed an amount sufficient to compensate for heat losses, thus permitting condensation of the desired products with maximum efficiency.

The substance to be treated is introduced by a pipe A' which preferably discharges at a point below the normal level of the substance to be treated in first chamber A. A similar pipe B' leads from chamber A to chamber B, a similar pipe C′ from chamber B to chamber C, a similar pipe D′ from chamber C to chamber D, and a similar pipe E′ from chamber D to chamber E. The exit of pipes A′, B′, C′, D′, and E′ may be of any desired shape or form, a conventional distributor being shown in the drawings.

The gaseous products accumulating in chamber E are conveyed therefrom by a pipe $E^2$ which assumes any desired form in chamber D sufficient to afford desired condensing and heating surface (a conventional coil being shown merely as a simple illustrative form) and enters a trap or separator $E^3$ from which the liquid distillate may be removed by a pipe $E^4$ and the gaseous products by a pipe $D^2$ which enters chamber C and leads to trap $D^3$ with distillate removal pipe $D^4$. The gaseous products pass in similar manner through the remaining chambers B and A by pipes $C^2$ and $B^2$, entering traps $C^3$ and $B^3$, respectively, having distillate removal pipes $C^4$ and $B^4$. From trap $B^3$ the gaseous products enter a pipe G which passes preferably through a condenser G′ and then to trap $G^2$ having a distillate removal pipe $G^3$. The gaseous products are led from trap $G^2$ by a pipe $G^4$ preferably having a blow-off $G^5$ therein and enter a gas booster $G^6$ of any desired type which forces the gas into a pipe $G^7$ from which it may be introduced again into pipe A′. Blow-off $G^5$ may be set to blow off at any desired pressure. When the apparatus is used for distillation as distinguished from cracking, it will blow off at a pressure sufficient to keep the temperature in the circuit less than a cracking temperature. When used for cracking, blow off valve $G^5$ is set to permit sufficient pressure to be built up to give the desired cracking temperature. The apparatus may be used below atmospheric pressure in any desired manner as by closing blow-off $G^5$ and running gas booster $G^6$ as an exhauster in connection with a blow-off $G^{10}$ and valve $G^{11}$ which may if desired be of a type to maintain automatically any constant pressure on its discharge side leading into chamber A.

In order to make up for any gases lost in the process or to introduce an independent circulating medium, one end of pipe $G^7$ is left open as indicated at $G^8$ controlled by a valve $G^9$.

Each of the chambers is connected to its succeeding chamber with a by-pass pipe H′, $H^2$, $H^3$, and $H^4$ with valves $H^5$, $H^6$, $H^7$, and $H^8$, respectively, therein, in order that all or any part of the lighter constituents in the circuit may, if desired, be passed through any chamber without passing through the heavier constituents therein. If it is desired to pass the gas from pipe $G^7$ over the substance without causing it to bubble through the substance to be treated, any desired construction may be used such as a pipe $H^9$ connecting chamber A with pipe $G^7$ with a suitable valve $H^{10}$ therein. This construction, in connection with by-pass pipes H′, $H^2$, $H^3$, and $H^4$, enables any or all of the chambers A, B, C, D, and E to pass all or any portion of the gas either through or over the substance to be treated.

Chamber E may be provided with a valve controlled outlet $E^5$ for the removal of residuum products and with a pressure gauge $E^6$ to indicate the proper setting for blow-off $G^5$ or $G^{10}$.

Chambers A, B, C, D, and E may be provided with valve controlled outlets $A^7$, $B^7$, $C^7$, $D^7$, and $E^7$ respectively, for draining or similar purposes.

The pipe $G^7$ which has been described in the embodiment illustrated above as conveying a gas to the circuit, is intended to act as a conveyor for any desired circulating medium, which may be either the gas from gas booster $G^6$ or an introduced gas or an introduced liquid (which may provide a gaseous medium while in the circuit), or both. In said embodiment, for example, a liquid containing volatile products which are adapted to become a gaseous circulating medium during the course of the circuit may be utilized in whole or in part. The circulating medium may be of a nature foreign to the substance to be treated, may unite chemically therewith, may be composed of the same chemical elements as the substance, may be of a catalytic nature, and/or may be miscible or immiscible with the substance to be treated. In treating a substance which contains volatile products in sufficient quantity to form a gaseous circulating medium during the treatment, it preferably is introduced directly at pipe A′ without the utilization of pipe $G^7$ except if desired as a conveyor for surplus gases available after the circuit is completed. In other words, it is the purpose to employ a gaseous medium traveling through the circuit either bubbling through the substance to be treated or passing adjacent the surface thereof, which will travel through the circuit and aid in the formation of desired gaseous products and in some instances become progressively saturated therewith, both the circulating medium and the products given off being subjected to progressive heat treatment. It will be noted that the circulating medium travels in the same general direction as the substance to be treated and that the heating is progressive. At the same time and at different stages part of the gaseous products are cooled to a condensing point by passing them in reverse direction through the chambers. As the gaseous products give up their heat retrogressively, the heat is taken up progressively by the substance to be treated and its circulating medium, traveling in the opposite direction or forward in the illustrative embodiment. This results in an economy of heat not attained heretofore. The substance to be treated is heated and the gaseous products obtained by such treatment are cooled partly by bringing them through successive stages within the respective heating and cooling influence of each other while physically separated.

Referring to the illustrative embodiment of Figure 2 of the drawings, the substance to be cracked or its molecular formation changed is admitted at entrance pipe 1 through which it flows preferably first into a first saturator 2 where the substance may be saturated with a gas or vapor (referred to hereinafter), from which it flows by pipe 3 into a second and similar saturator 4 and thence by pipes 5 and 6 to the pump 7. From pump 7 the substance is forced through the pipe 8 into the first condenser saturator 20. Preferably before entering first condenser saturator 20, the substance meets a circulating medium introduced into pipe 8 by a pipe 10 through which it is forced by a booster 11. (The circulating medium may be formed during the process instead of being wholly or partly introduced, as set forth above in connection with the description concerning Figure 1.) Both the substance and the circulating medium, therefore, enter first condenser saturator 20 together and preferably are discharged within the saturator at a point blow the normal level of the substance therein undergoing treatment.

From first condenser saturator 20 both the substance and the circulating medium flow by a pipe 21 into the next condenser saturator 30 in a similar manner, and so on into condenser saturators 40, 50, 60, and 70 of any desired number by pipes 31, 41, 51, and 61, respectively, until they have reached the last condenser saturator 70 from which they flow by pipe 71 to the first of a series of cracking chambers 100 into which they discharge preferably below the normal liquid level maintained therein. The first chamber 100 generally operates only as a heater but it may be used as a cracking chamber if desired. From chamber 100 the substance and circulating medium flow by pipe 101 into chamber 110 into which they discharge in a similar manner, and so on into succeeding chambers 120 and 130 by pipes 111 and 121, respectively. Any desired number of chambers may be used. Although pipes 71, 101, 111, and 121 are shown as discharging below the normal liquid level, it is not essential that the discharge be adjacent the bottom as in some instances it may be at a higher point and even above the normal liquid level.

From final cracking chamber 130 and to some extent from the previous cracking chambers the sludge and excess residuums are drawn off either continuously or intermittently from their lower portion by means of suitable valves such, for example, as the valves 105 and 106, 115 and 116, 125 and 126, and 135 and 136, respectively, and the locks 107, 117, 127, and 137, intermediate, respectively, said valves.

The gaseous products finally accumulating in cracking chamber 130 together with the circulating medium pass from the upper portion 131 of said chamber and are conducted by a pipe 133 to the last condenser saturator 70 where the pipe assumes any desired form sufficient to afford desired condensing and heating surface (a conventional coil 72 being shown merely as a simple illustrative form) after passing through which coil the products and medium enter a trap or separator 73 and thence to the next condenser coil 62 contained within the next condenser saturator 60 and so on through trap 63, condenser coil 52, trap 53, condenser coil 42, trap 43, condenser coil 32, trap 33, condenser coil 22, thus flowing countercurrent to their original flow during their forward movement toward first cracking chamber 100. After passing through condenser coil 22 in first condenser saturator 20 and passing through the trap or separator 23 the products and medium remaining pass preferably through pipe 80 to auxiliary condenser 12 and thence through pipe 81 to trap or separator 13 and thence through pipes 82, 83 to booster 11 from which they are returned for recirculation through pipe 10. The traps or separators 23, 33, 43, 53, 63, and 73, shown as receiving the discharge from the condenser coils 22, 32, 42, 52, 62, and 72, respectively, in each condenser saturator 20, 30, 40, 50, 60, and 70, respectively, serve to collect and separate any liquid condensate which may occur in and be discharged from its respective condenser coil and each is connected by a pipe 24, 34, 44, 54, 64, and 74, respectively, to a coil or other cooling surface 25, 35, 45, 55, 65, and 75, respectively, where the liquid condensate may be cooled in cooling jackets 26, 36, 46, 56, 66, and 76, respectively, before discharging through the traps 27, 37, 47, 57, 67, and 77, respectively, into the substantially atmospheric pressure collector tanks 28, 38, 48, 58, 68, and 78, respectively, where the liquid may be relieved of its gas charge obtained while under pressure. From these tanks 28, 38, 48, 58, 68, and 78, respectively, the liquid condensate may be removed, while the light products so relieved preferably are conducted by pipes 84 and 85 into saturator 4, and from saturator 4 to saturator 2 by pipe 86, where they preferably bubble through the incoming substance to be treated. The incoming substance thus is enabled to absorb or take up or carry these light products or certain portions thereof so that the light products or parts thereof again pass through the circuit. Any desired number of absorbers may be used. Any desired relief means may be supplied for any surplus such for example as an escape pipe 87 in the last absorber receiving the light products when a plurality of absorbers is used.

The condensate is removed from trap or separator 13 referred to above by a pipe 180 leading to a trap 181 and thence by a pipe 182 preferably to a substantially atmospheric pressure collector tank 183 from which the lighter products are conveyed by a pipe 184 to pipe 85 into which pipe 84 from preferably substantially atmospheric tanks 28, 38, 48, 58, 68. and 78 also leads. The condensate from collector tank 183 may be removed by a pipe 185 or all or any portion thereof fed into the incoming substance to be treated by a pipe 186.

The preferably substantially uncooled condensate from traps or separators 23, 33, 43, 53, 63, and 73 may if desired be returned to first cracking chamber 100 through the branch pipes 29, 39, 49, 59, 69, 79, respectively, and by this means subjected to another treatment through the cracking chambers 100, 110, 120, and 130 and thus rerun for further cracking should they prove to be too heavy to make a desirable product in themselves or to contain too small a percentage of the desirable product to warrant removing them from the apparatus.

In further explanation of the drawings it will be noted that first cracking chamber 100 and crackers 110, 120, and 130 are surrounded at their midportion by independent combustion chambers 102, 112, 122, and 132, respectively, by means of which heat may be applied to the walls of the chambers and their contents heated to the desired temperature.

Any or all of the chambers may be provided with a gauge glass to indicate the level of the substances contained therein and also with a suitable pressure gauge to indicate the pressure maintained within. Such a gauge glass and pressure gauge is indicated at 140 and 160, respectivley, on the top portion 131 of chamber 130.

Pressure sufficient to permit increase of temperature to the desired point for cracking or change of molecular formation is maintained in the circuit by suitable blowoff valves of any desired type and at any suitable place which can be set or regulated in well known manner. A conventional blow-off 88 is shown connected to trap or separator 13 which may in turn have its outlet connected in such manner as to conserve any products discharged therefrom and in similar manner products discharged from pipe 87 also may be conserved.

The saturators 2 and 4 are provided with by-passes and valves as illustrated so that the incoming substance may pass through one or both, or admitted to pump 7 directly through pipe 9 without passing through either of said saturators.

It is to be understood that in some instances it will not be necessary to reintroduce surplus or remaining gases into the circuit and the system of piping and valves illustrated is adapted to permit such operation either wholly or in part, or if desired to permit the use of the saturators with any suitable scrubbing substance.

The chambers 20, 30, 40, 50, 60, and 70 and their associated parts may be used for distillation by control of temperature through control of pressure or otherwise. The apparatus may be used both for distillation and for cracking by proper temperature regulation in both sets of chambers.

As indicated above any desired number of the condenser-saturator chambers may be used in the condensing and distilling zone to effect the desired result, likewise in the cracking or maximum temperature zone in which heat is applied externally to the chambers 100, 110, 120 and 130 the number of chambers may be varied to suit the treatment of any particular oil or substance treated.

One method of operation of the apparatus described above is as follows: The substance to be treated and the circulating medium enter first condenser saturator 20 and are heated by coil 22 which they in turn cool. In the successive condenser saturators 30, 40, 50, 60, and 70 this heating of the substance and medium and cooling of the coils proceeds progressively. The substance and medium then pass to the first cracking chamber 100 which may if desired act only or partially as a further preheater with very little or no cracking action. The substance and circulating medium and any products formed pass through the succeeding chambers 110, 120, and 130 where they are subjected to progressive heat treatment preferably without the removal of any part thereof except sludge or similar heavy products. It is evident that the gaseous substances passing from a cracking chamber carry away products formed in the chambers up to that point. As the temperature of each succeeding chamber is in excess of the preceding chamber, new products are formed, and as the entering gases lack these new products, it is believed that a condition is created which facilitates the formation of the desired products.

The gases leaving the last chamber 130 are conducted to coil 72 in last saturator condenser 70 where the heaviest constituents thereof are condensed in great measure while the lighter portions pass to the next coil 62 in condenser saturator 60 where further condensate is removed and lighter portions passed on through coils 52, 42, and 32 until coil 22 and condenser 12 remove the lightest condensate. The lighter gases either are returned direct to gas booster 11 for recirculation or otherwise utilized. Any excess gas which may be formed in the process may be removed from the circuit and treated or used in any desired manner and such gas as may be required as "make-up" in the circuit may be introduced from any desirable outside source as by means of pipe 14 with valve as indicated.

The liquid condensates passing from coils 22, 32, 42, 52, 62, and 72 may be cooled, relieved from pressure, and their lighter portions conveyed away as described, or one or more of the preferably uncooled condensates may be returned to the cracking chambers for rerunning and further treatment as indicated by pipes 29, 39, 49, 59, 69, and 79.

The cracking chambers preferably are formed with substantially vertical walls and heated through only a portion of their length, thus providing a bottom portion and a top portion substantially removed from the zone of heat application. This tends to prevent an accumulation of the high carbon content sludge or semi-coke in the upper portion and facilitates the removal of residuum from the lower portion.

As a specific example of materials used, temperatures and pressures employed, yields of named products obtained, dimensions of apparatus and working details in a particular instance, an actual run of seventy-two hours on an experimental apparatus will be described. In this apparatus, six condenser saturators were used comprising steel pipes approximately 12 inches in diameter and 4 feet high. Four cracking chambers were used comprising steel pipes approximately 12 inches in diameter and 8 feet high, the last one having an extension approximately 5 feet high to prevent foam entering the exit vapor pipe. The connecting pipes were approximately 2 inches in diameter. The coils inside the condenser saturators were formed of pipe approximately 1¼ inches in diameter. The circulating medium was natural gas or stripped oven gas. The material used comprised gas oil showing a distillation test as follows:

Gas oil

| Gravity | 35.5° Baumé |
|---|---|
| Temp. | Percentage over |
| 350° F | First drop |
| 400° F. | 2% |
| 450° F. | 8% |
| 500° F. | 19% |
| Residue | 80% |
| Loss | 1% |

After the cycle of operations was established the material in each of the four cracking chambers was given a distillation test as follows:

First chamber

| Gravity | 35.7° Baumé |
|---|---|
| Temp. | Percentage over |
| 320° F. | First drop |
| 400° F. | 8% |
| 450° F. | 19% |
| 500° F. | 38% |

Second chamber

| Gravity | 34.0° Baumé |
|---|---|
| Temp. | Percentage over |
| 300° F. | First drop |
| 400° F. | 1% |
| 450° F. | 10% |
| 500° F. | 30% |

Third chamber

| Gravity | 29.8° Baumé |
|---|---|
| Temp. | Percentage over |
| 380° F. | First drop |
| 450° F. | 2% |
| 500° F. | 10% |

Fourth chamber

| Gravity | 28.3° Baumé |
|---|---|
| Temp. | Percentage over |
| 340° F. | First drop |
| 400° F. | 4% |
| 500° F. | 26.5% |

As the above samples were taken from the sludge removal openings, complete cooling for successive samples was not attained. Some loss through vapors formed by reduction of pressure, therefore occurred.

A distillation test of the distillate in the coils of each of the first five condenser saturators was as follows:

First condenser saturator

| Gravity | 34.2° Baumé |
|---|---|
| Temp. | Percentage over |
| 120° F. | First drop |
| 300° F. | 2% |
| 400° F. | 3% |
| 450° F. | 7% |
| 500° F. | 16% |
| Residue | 84% |
| Loss | 0% |

Second condenser saturator

| Gravity | 39.5° Baumé |
|---|---|
| Temp. | Percentage over |
| 180° F. | First drop |
| 250° F. | 1% |
| 300° F. | 2% |
| 400° F. | 14% |
| 450° F. | 27% |
| 500° F. | 47.5% |
| Residue | 50% |
| Loss | 2.2% |

Third condenser saturator

| | |
|---|---|
| Gravity | 45.6° Baumé |

| Temp. | Percentage over |
|---|---|
| 170° F. | First drop |
| 250° F. | 1.5% |
| 300° F. | 11% |
| 350° F. | 21% |
| 400° F. | 35% |
| 450° F. | 55% |
| Residue | 42% |
| Loss | 3% |

Fourth condenser saturator

| | |
|---|---|
| Gravity | 56.7° Baumé |

| Temp. | Percentage over |
|---|---|
| 120° F. | First drop |
| 150° F. | 3% |
| 200° F. | 13% |
| 250° F. | 25% |
| 300° F. | 37% |
| 350° F. | 50% |
| 400° F. | 60% |
| 450° F. | 73% |
| Residue | 17% |
| Loss | 10% |

Fifth condenser saturator

Small quantities of wild product from 60° to 80° Baumé. Not run through distillation test.

Other distillates of a higher gravity Baumé were caught by ice cooling but were not distilled.

During the run results were noted as follows:

Material used, 1463½ gallons gas oil.
Products obtained, 789½ gallons of distillate of 48.6° Baumé; 563 gallons residue.
Lost and unaccounted for, 111 gallons.

(Distillates were drawn into open containers from which samples were taken. No attempt was made to conserve the volatile products which dissipated into vapor.)

Pressure varied from 100 to 150 pounds per square inch.

Average temperatures were as follows:

| | |
|---|---|
| First chamber | 684° F. |
| Second chamber | 708° F. |
| Third chamber | 713° F. |
| Fourth chamber | 737° F. |
| First condenser saturator | 371° F. |
| Second condenser saturator | 331° F. |
| Third condenser saturator | 188° F. |
| Fourth condenser saturator | 99° F. |
| Fifth condenser saturator | 87° F. |

(Note: Temperature readings, although best obtainable, were not considered of laboratory standard owing to difficulty of obtaining same, breaking of thermometers, and lack of thorough insulation. Later tests and other thermometers indicated that higher temperatures in the cracking chambers could be used advantageously. The low boiling constituents found in residuum of fourth chamber was due to ineffective insulation of the vapor line from the last chamber to the first condenser saturator, causing a run-back or reflux condenser action.)

The above data does not represent the results obtainable from an installation operating on a continuous commercial basis with all losses safeguarded. The beneficial results obtained, however, were greatly in excess of those obtained from any apparatus heretofore known. The same apparatus also was given a ten day run, using approximately one hundred barrels of gas oil with yield results approximately the same as on the seventy-two hour test.

Figures 3, 4, and 5 show a series of illustrative heating chambers comprising upper and lower drums, respectively, 201 and 202, 211 and 212, and 221 and 222. Said drums are provided with pipes or tubes 203, 213, and 223, respectively, connecting said drums and exposed to the direct action of heat from which the drums themselves are protected by the refractory material of a furnace construction 300. The pipes or tubes 203, 213, and 223 preferably increase in size in the direction of flow of the substance to be treated. Independent sources of heat to each series of tubes may be used if desired.

The top and bottom drums of each chamber of this embodiment are connected by an independent conduit 204, 214, and 224, respectively, and a circuit between the drums is established by a pipe or tube leading from one top drum to the conduit of the succeeding drum as illustrated by pipes 215 and 225. The substance to be treated is conveyed by pipe 205 from a main pipe 305 to conduit 204. A valve and trap system of relief 206, 216, and 226 is provided at the bottom of each chamber.

In operation the substance to be treated is conveyed from a main pipe 305 through pipe 205 to a conduit 204, where it proceeds upwardly into drum 201, downward through pipes 203, and up again through conduit 204 to drum 201, from which portions thereof are conveyed to conduit 214 of the next chamber by pipe 215. We thus have a downward circulation of the substance to be treated through a portion of the treating chamber exposed to the direct action of heat with the top portion where the gaseous products leave the chamber and the bottom portion where the residuum products are withdrawn protected from the same degree of heat which is utilized for the treating of the substance during its downward circulation.

In the furnace construction 300 air pipes 301 may be provided between adjacent chambers to provide for the introduction of air in order to aid combustion, or control within desired limits the amount of heat in each chamber.

The chambers are connected by pipes 305, 315, and 325 having valves therein 306, 316, and 326, respectively, so that any of the gaseous products may if desired be passed from chamber to chamber without bubbling through the substance to be treated, which usually is an incident of passing the gaseous products through the chamber with the downward circulation above described. Chamber 201 is provided with a separate intake 307 for any desired purpose such as the reintroduction of a condensate from the condensation of gases obtained. Chamber 221 is provided with an exit 328 for gases leaving the series of chambers.

Figure 6 is an enlarged detailed illustration of a heating chamber comprising upper and lower drums 401, 402. Said drums are provided with a pipe or tube 403 connecting said drums. The top and bottom drums of this embodiment are connected by an independent conduit 404 and a circuit between the drums thus established. The substance to be treated is conveyed to conduit 404 by a pipe 405. In order to ensure that the incoming substance to be treated will be circulated upwardly in conduit 404 and downwardly through pipe 403, any desired force to induce this circulation may be provided such for example as a propeller 406 operated in any desired manner as by a shaft 407 having a pulley 408 thereon.

A gauge glass system 410 is shown connected to drum 401 having cooling jackets 411 and an entrance pipe 412 through which a gas may be introduced to keep the gauge glass free from obscuring vapors from the drum.

It will be noted that pipe 403 extends below the bottom of conduit 404. It is believed that this construction prevents the heavier residuums from entering the conduit 404 and will aid its accumulation in the bottom of lower chamber 402 and subsequent easy discharge therefrom.

In order to aid in clearness of illustration, many details familiar to those skilled in the art, such, for example, as insulation, have been omitted from the disclosure.

Many modifications of my invention will be apparent to those skilled in the art without departing therefrom or from the scope of the claims, my invention not being limited to the embodiments thereof chosen for illustrative purposes but consisting of the treatment of substances with heat adapted to obtain improved results with increased economies.

What I claim and desire to secure by Letters Patent is:

1. The process of obtaining distillates of different boiling points from a liquid hydrocarbon which comprises heating the liquid hydrocarbon in stages increasing in temperature to produce vapor therefrom which also passes through some of said stages, separating said liquid and vapor, and cooling the separated vapor in stages decreasing in temperature to produce distillates therefrom, in which the liquid and the separated vapor flow in opposite directions and within the thermal influence of each other so that the heating of the liquid and the cooling of the separated vapor is obtained in part from such thermal influence.

2. The process of treating a liquid with heat which comprises causing a circulating medium to pass through separate successive containers of said liquid and progressively heating said liquid, said medium, and the vapor given off by each successive heat treatment and progressively saturating said medium and vapor with a desired product of the successive heat treatments.

3. The process of treating a liquid with heat which comprises causing a circulating medium which unites chemically with the liquid to pass through successive separate containers of said liquid and progressively heating said liquid, said medium, and the vapor given off by each successive heat treatment and progressively saturating said medium and vapor with a desired product of the successive heat treatments.

4. The process of treating a liquid with heat which comprises causing a circulating medium composed of the same elements as the liquid to pass through successive containers of said liquid and progressively heating said liquid, said medium, and the vapor given off by each successive heat treatment and progressively saturating said medium and vapor with a desired product of the successive heat treatments.

5. The process of treating a hydrocarbon liquid with heat which comprises causing a circulating medium to pass through successive containers of said liquid and progressively heating said liquid, said medium, and the vapor given off by each successive heat treatment and progressively saturating said medium and vapor with a desired product of the successive heat treatments.

6. The process of treating a hydrocarbon liquid with heat which comprises causing a hydrocarbon circulating medium to pass through successive containers of said liquid and progressively heating said liquid, said medium, and the vapor given off by each successive heat treatment and progressively saturating said medium and vapor with a desired product of the successive heat treatments.

7. The process of treating a liquid with heat which comprises causing a circulating medium to pass in the same general direction as the liquid through successive containers of said liquid and progressively heating said liquid, said medium, and the vapor given off by each successive heat treatment and progressively saturating said medium and vapor with a desired product of the successive heat treatments.

8. The process of treating a liquid with heat which comprises causing a circulating medium to pass through successive containers of said liquid and progressively heating said liquid, said medium, and the vapor given off by each successive heat treatment and progressively saturating said medium and vapor with a desired product of the successive heat treatments, the heat being supplied in some of said heat treatments by a gaseous product of said treatments.

9. The process of treating a liquid with heat which comprises causing a circulating medium to pass through successive containers of said liquid and progressively heating said liquid, said medium, and the vapor given off by each successive heat treatment and progressively saturating said medium and vapor with a desired product of the successive heat treatments, the heat being supplied in some of said heat treatments by a gaseous product of said treatments and said medium.

10. A continuous process of separating various products from a liquid, which comprises feeding the liquid forwardly into the first of a series of bodies of liquid having a similar constitution, maintaining said bodies respectively at progressively increasing temperatures; passing volatilized portions from each body forwardly into the next succeeding body while intimately and profoundly agitating the latter and obtaining various products from the liquid by a series of fractional condensations of the vapor issuing from one of said bodies.

11. A continuous process of separating various products from a liquid, which comprises feeding the liquid forwardly into the first of a series of bodies of liquid of similar constitution, maintaining said bodies respectively at progressively increasing temperatures, passing volatilized portions from each body forwardly into the next succeeding body while intimately and profoundly agitating the latter and obtaining various products from the liquid by a series of fractional condensations of the vapor issuing from the last of the series of bodies of liquid.

12. A continuous process of separating various products from a liquid, which comprises feeding the liquid forwardly into the first of a series of bodies of liquid originating from the said liquid being fed, maintaining said bodies respectively at progressively increasing temperatures; passing volatilized portions from each body forwardly into the next succeeding body while intimately and profoundly agitating the latter and obtaining various products from the liquid by a series of fractional condensations of vapor issuing from one of said bodies.

13. A continuous process of separating various products from a liquid, which comprises feeding the liquid forwardly into the first of a series of bodies of liquid of similar constitution, maintaining said bodies respectively at progressively increasing temperatures by passing the vapors from the last of the series of bodies through conduits in contact with said bodies, heating the last of the series to produce vapors, passing volatilized portions from each body forwardly into the next succeeding body so as to intimately and profoundly agitate the latter, and obtaining various products from the liquid by a series of fractional condensations of the vapor passing through said conduits.

14. A continuous process of treating hydrocarbon oils which comprises maintaining under pressure a series of separate bodies of oil, maintaining said bodies respectively at progressively increasing temperatures reaching the cracking point of the oil, passing volatilized portions in each body forwardly into the next liquid body while intimately agitating the latter, passing vapors and gases from the body at cracking temperature countercurrent to and in diaphragm contact with the liquid in the bodies moving toward said body at cracking temperature and condensing gasoline from said vapors.

15. An apparatus for carrying out the process described which comprises a series of containers, a perforated nozzle for introducing liquid to the first container and small nozzles and connecting pipes for conveying liquid from each container to the next succeeding container, said nozzles being constructed to intimately and profoundly cause the liquid to be agitated, means for heating the last container of the series, a vapor conduit from the last container running through the various containers back to the first with adequate heat transfer surfaces and means for removing fractional condensates from said vapor conduit.

16. The process of refining hydrocarbon oil which comprises passing a mixture of oil and gas through heating zones maintained at increasing temperatures, vaporizing a portion of the oil in each zone and absorbing the vapors evolved in said gas, passing the gas and vapors from the final heating countercurrent to and in a heat interchanging relation with the liquid passing through said heating zones and condensing a portion of said vapors in each zone.

17. The process of refining hydrocarbon oil which comprises passing oil through a series of zones maintained at progressively higher temperatures, vaporizing said oil as it advances through said zones, circulating gas in parallel and in contact with the oil through said zones to absorb vapors, and passing said gas and vapors countercurrent through, but out of contact with, said oil to condense said vapors, and returning said gas to said oil in a closed cycle.

18. In an apparatus for refining hydrocarbon oil, a fractionating still which comprises a series of chambers, means for passing liquid progressively through said chambers and for bubbling gas up through oil in each chamber and means for directing said gas and oil through successive chambers in parallel paths in the same direction.

19. In an apparatus for refining hydrocarbon oil a fractionating still which comprises a series of chambers, means for passing oil progressively through said chambers and for bubbling gas up through each chamber, means for directing said gas and oil through successive chambers in parallel paths, vapor condensing means in each chamber, said condensing means being interconnected.

20. A continuous process of treating oil which comprises maintaining under pressure a series of bodies of oil at progressively increasing temperatures including the cracking point for the oil being treated, feeding the oil forwardly through said series of bodies to the one at cracking temperature, passing volatilized portions of each body forwardly into the next succeeding body of oil while intimately agitating the latter, passing vapors and gases from said body at cracking temperature countercurrent to and in diaphragm contact with the oil passing to the body at cracking temperature and obtaining various products from the oil by a series of fractional condensations of said vapor.

21. The process of treating a hydrocarbon liquid with heat which comprises causing a hydrocarbon circulating medium to pass through successive separate containers of said liquid, holding said medium and liquid under pressure, progressively heating said liquid, said medium and the vapors given off by each successive treatment, progressively saturating said medium and vapor with the desired product of successive heat treatments and finally bringing said medium and liquid to a temperature sufficiently high for cracking the liquid.

22. The process of refining hydrocarbon oil which comprises passing a mixture of oil and gas through zones maintained at increasing temperatures, holding oil and gas under super-atmospheric pressure, vaporizing a portion of the oil in each zone, and absorbing vapors evolved in the said gas, maintaining the maximum temperature of the said oil and gas mixture sufficiently high to crack the oil, passing the gas and vapors from the cracking or maximum temperature stage to and in a heat interchanging relationship with the liquid passing through said heating zones and condensing a portion of the said vapor in each zone.

23. The process of cracking hydrocarbon oils under pressure which comprises heating and agitating the oil in a plurality of zones of increasing temperature, vaporizing portions of said oil in said zones and passing the vapors formed in each zone in contact with the liquid in the next succeeding zone of higher temperature, heating the oil in a final zone to a cracking temperature, passing the vapors from said final zone in heat interchange but out of contact with advancing oil in other of said zones whereby condensates are produced and mingling a portion of said condensates with the oil in said final zone.

24. A process for the conversion of hydrocarbon oils, consisting in subjecting a stream of oil while passing through a heating tube to a cracking temperature, in delivering the highly heated oil to an enlarged chamber, in discharging vapors generated from the heated oil to a dephlegmator, in introducing a stream of oil to the dephlegmator to pass therethrough in indirect heat conductive relation with the vapors traveling through said dephlegmator without permitting physical intermingling of such stream of oil with said vapors to assist in condensing the insufficiently cracked vapors, in preventing the return of unvaporized residue from the enlarged chamber to the heating tube, in introducing preheated oil from the dephlegmator and reflux condensate to the inlet side of the heating tube, and in maintaining a superatmospheric pressure on the oil undergoing conversion.

25. Apparatus of the type described, which comprises fractionating units connected in series for the passage of vapors, means for passing liquid through said units separate from and counter-current to the flow of vapors therethrough, means for vaporizing portions of said liquid in said units with heat from said vapors comprising heat exchangers in said units, a condenser connected to receive vapors from the heat exchanger of the final unit of the series, means for separating gases from the condensate formed in said condenser and means for passing said separated gases in intimate contact with the liquid through each of said units.

26. A continuous process of distilling oils, which comprises passing a mixture of oil and gas through a series of combined heating and condensing chambers maintained at progressively higher temperatures, introducing the heated mixture into a final heating zone maintained at a higher temperature than said chambers, passing vapors and gas from said final zone through said chambers in indirect heat exchange with said mixture whereby a series of condensates is produced from said vapors and refluxing certain of said condensates back into said final zone.

27. The process of distilling oils which comprises vaporizing the oils under equilibrium conditions, integrating the vapors and oils, and progressively raising the temperature of the mixture thereof, while maintaining the vapors and oils in contact, then removing the vapors maintained in substantial equilibrium with the oils and condensing them.

28. The process of distilling liquid oils which comprises heating and vaporizing the oils, maintaining all the vapors produced and the liquid oils, from which the vapors are derived, in intimate contact while progressively raising the temperature of the mixture thereof in successive stages, then removing said vapors when in substantial equilibrium with the liquid oils at a predetermined temperature, and condensing said vapors.

29. The process of distilling petroleum oils which comprise heating and vaporizing the oils, thoroughly integrating all of the vapors and all of the oils and keeping them in intimate contact while progressively raising the temperature of the mixture thereof in successive stages, then removing said vapors while they are in substantial equilibrium with the oils at a predetermined temperature and condensing them.

30. The process of distilling mixtures of oils of different molecular weights, which comprises heating and vaporizing the oils in a closed vessel, keeping the vapors given off and the oils in intimate contact, progressively raising the temperature of the oils and vapors by heating them in successive stages under equilibrium conditions until a predetermined vapor density of the constituents of the oils at a predetermined temperature is reached, then removing and condensing the vapors.

31. The process of distilling mixtures of liquids for producing motor fuels which comprises heating and vaporizing the liquids in a closed vessel in the presence of vapors of the liquids, raising the temperature of the liquids and vapors by heating them in successive stages at progressively increasing temperatures, all the vapors given off being retained under equilibrium conditions in contact with the liquid mixture, continuously integrating the vapors with the liquids until a predetermined temperature is reached, with substantial equilibrium between the vapors and liquids, then removing and condensing the vapors.

32. The process of distilling crude oils and mixtures thereof with other liquids which comprises heating the mixed liquids and vaporizing the same, simultaneously raising the temperature of the liquid mixture and the vapors therefrom by the application of heat in successive stages at progressively increasing temperatures, retaining the mixed vapors in contact and in substantial equilibrium with the mixed liquids, thereby facilitating reabsorption of the vapors, integrating the mixed vapors with the liquid mixture through the successive heating stages until a predetermined partial pressure of the various vapors in equilibrium with the mixed liquids at a predetermined temperature is reached, then removing and condensing the vapors.

33. The process of distilling crude oils and mixtures of oils with other liquids, which comprises progressively heating and vaporizing the mixed liquids to thereby generate vapors of the constituents at increasing temperatures, keeping the vapors in contact with the liquids while continuously integrating the vapors and liquids and maintaining substantial equilibrum therebetween, then removing the vapors when a predetermined partial pressure of the various vapor constituents is reached at a predetermined temperature, and condensing them.

34. The process of distilling hydrocarbon oils and the like which comprises heating and raising the temperature of the liquids in a plurality of successive stages, for generating vapors thereof, the vapors and liquids being maintained in substantial equilibrium, while progressively raising the temperature of the liquids and vapors successively in each stage, maintaining the vapors and liquids in intimate contact to promote absorption and integration of the vapors by and with the liquids, then at a predetermined equilibrium partial pressure of the vapors at a predetermined temperature removing and condensing the vapors.

35. The process of distilling crude oils and mixtures of oils and liquid fuels which comprises progressively vaporizing and raising the temperature of the liquids by heating the mixed liquids and vapors successively at progressively increasing temperatures, maintaining the liquids and the vapors given off in intimate contact, agitating the vapors with the liquids, thereby integrating them and facilitating reabsorption and re-evaporation, maintaining a substantial equilibrium between the vapors and liquids, then removing the vapors while in substantial equilibrium at a predetermined density and temperature and condensing them.

36. The process of distilling crude oils and mixtures of oils and liquid fuels which comprises progressively vaporizing and raising the temperature of the liquids and vapors by heating the mixed liquids and vapors in a plurality of successive stages, maintaining the successive stages at progressively increasing temperatures, maintaining the liquids and the vapors in intimate contact, agitating the vapors and liquids as they flow in opposite directions to thereby facilitate integrating the vapors with the liquids to produce substantial equilibrium, then removing the vapors at a predetermined density and temperature and condensing them.

37. The process of cracking petroleum oils, which comprises passing the oil to be cracked through a series of zones of increasing temperature in the last of which the temperature is sufficiently high to crack the oil into lower boiling products, heating the oil in each zone to a temperature sufficient to vaporize portions thereof, passing the vapors formed in each zone into intimate contact with the oil constituents in the next succeeding zone of higher temperature to thereby maintain substantial equilibrium between the liquid and vapor constituents of the oil, separating the combined vapors from the liquid and vapor mixture heated in the final heating zone, and subjecting the separated vapors to fractional condensation.

38. An apparatus for treating oil comprising a downcomer tube, means for heating said tube, a riser tube connected to the upper and lower ends of said downcomer tube, said riser being located outside of said heating means, means for introducing oil to be treated into said riser in an upwardly directed current, and mechanical means in said riser tube for causing the flow of oil therethrough whereby oil is caused to circulate in a cyclic path upwardly through said riser and downwardly through said heated downcomer tube.

39. An apparatus for treating oil, comprising a heating chamber, upper and lower containers respectively above and below said chamber, a tube passing through said chamber connecting said containers, said tube being adapted to be heated in said chamber, an unheated tube outside said chamber connecting said containers, the point of connection of the unheated tube with the lower container being at a level substantially above the point of discharge of the first-mentioned tube thereinto, and a mechanical circulating means in said unheated tube adapted to force oil upwardly therethrough whereby oil may be circulated in a closed cycle upwardly through said unheated tube into the upper container and downwardly through said first-mentioned tube into the lower container thereby permitting the deposition of any solid or semi-solid carbonaceous material present in the oil in said lower container.

In testimony that I claim the foregoing, I have hereunto set my hand this 2nd day of January, 1920.

WILBUR G. LAIRD.